(No Model.)

W. H. BAKER.
ELECTRICAL INDICATOR AND ALARM.

No. 291,483. Patented Jan. 8, 1884.

ATTEST:

INVENTOR:
Wm H. Baker
by Wm B. Van size
Attorney

UNITED STATES PATENT OFFICE.

WILLIAM H. BAKER, OF BROOKLYN, NEW YORK.

ELECTRICAL INDICATOR AND ALARM.

SPECIFICATION forming part of Letters Patent No. 291,483, dated January 8, 1884.

Application filed April 28, 1883. (No model.)

*To all whom it may concern:*

Be it known that I, WM. H. BAKER, a citizen of the United States, residing in the city of Brooklyn, county of Kings, and State of New York, have invented certain new and useful Improvements in Electrical Indicators and Alarms, of which the following is a specification.

The object of my invention is to automatically designate or indicate at which one of a series of points or stations electrically connected therewith a closure of the normally-open circuit has occurred, and is applicable to the purposes of a burglar-alarm, an annunciator, or similar device.

My invention comprises a normally-open electrical circuit extending through all of the indicating points or stations and embracing an electro-magnet located in the indicator. In the indicator is also located a conducting ring or disk, upon the periphery of which normally rest a series of contact-springs, there being one spring for each indicating-point. An electrical conductor extends from each spring to its respective indicating point or station, where it is connected to one side of a circuit-closer, which may be of any well-known construction, suitable to be operated by the opening and closing of a door or window, or otherwise, as the character of the work required of it may determine. The other side of such circuit-closer is connected to a point in the normally-open circuit before referred to. At the center of this disk or ring is a radial arm pivoted to a freely-rotating arbor. A train of clock-work normally held in check by the electro-magnet has a tendency to impart to said arm a continuous movement in one direction, and this arm is so arranged that when started by the closing of the circuit at any circuit-closer in its movement it will disconnect the contact-springs from the said disk, each in turn, until it arrives at the spring corresponding with the point at which connection has been made, when the circuit, by such disconnection, is returned to its normal condition, and the clock-work is immediately stopped. A pointer operated by the clock-work indicates on a dial at which point the connection was made, and an electro-magnetic or other form of alarm started by the movement of the clock-work calls attention to the operation of the indicator.

Figure 1:
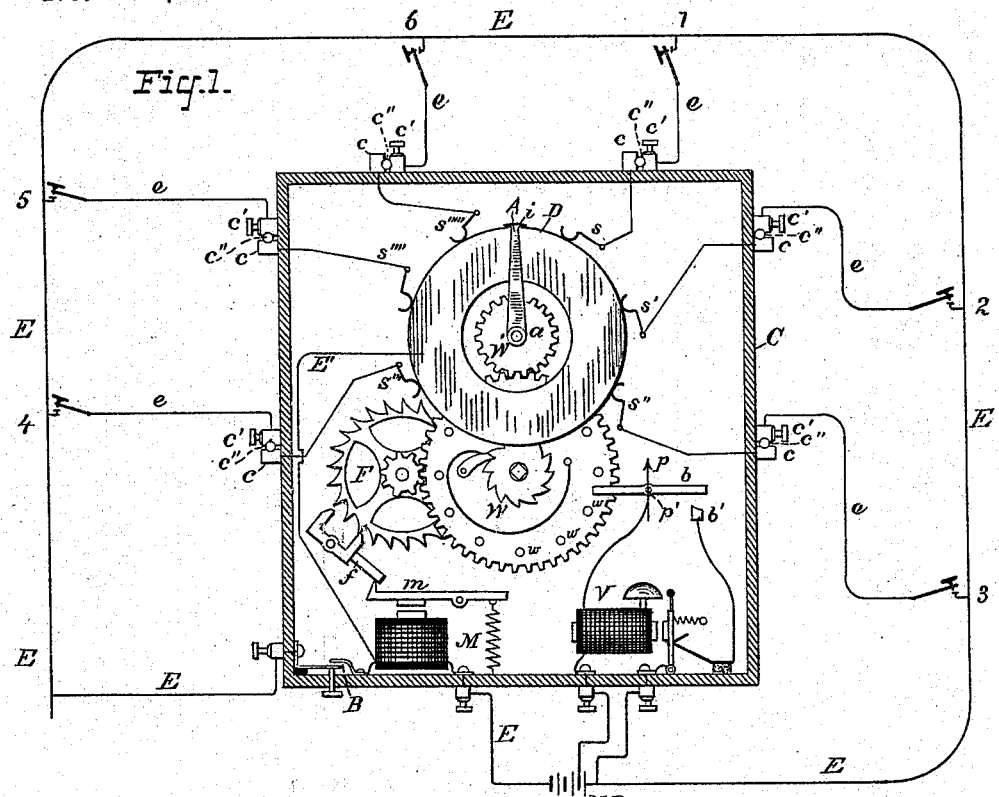
Figure 2:
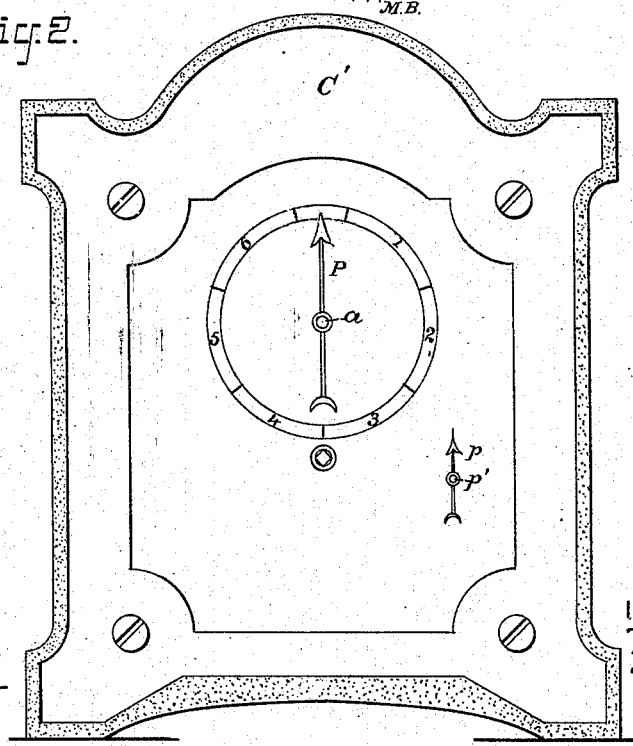

Referring to the accompanying drawings, Figure 1 is a complete plan view of my indicator and its electrical connections. Fig. 2 is a view of the case-cover, showing the dial and the arm for setting the alarm.

In Fig. 1, E is an electrical conductor extending from the electro-magnet M at the indicator through battery M B and each indicating-point or circuit-closers 1 2 3, &c., returning to the push-button or circuit-closer B, situated in the indicator-case, and normally open. The other end of this conductor is connected with the circuit-closer B, and also by wire E' to a metal disk or ring, D.

$s \; s' \; s''$, &c., are flat contact-springs, in number equal to the number of transmitting-points. From each of these springs a wire, $e$, is connected, through the cut-out and binding-post $c \; c' \; c''$, to one of the circuit-closers 1 2 3, &c., where it terminates in a circuit-closer, which may be of any desired character, so that connection may be made, when desired, between wires E and $e$.

A is an arm, pivoted at $a$, and having a constant tendency to rotate from left to right imparted to it by a train of clock-work consisting of wheels W W', having escapement F $f$. The said clock-work may be driven by a weight or spring, and is held in check by the armature-bar $m$ of electro-magnet M, which, when in a retracted position, as shown, blocks the movement of fly $f$, but when drawn to the magnet M by the passage of a current through said magnet allows fly $f$ to play freely, whereupon the clock-work rotates arm A, as described. Upon the outer end of arm A is a plate of insulating material, $i$, which, as arm A rotates, rides upon the periphery of the disk and passes in turn between each contact-spring and the disk, thus disconnecting one spring at a time in rotation.

V is an electro-magnetic vibrating alarm-bell of well-known construction.

$b$ is a metallic bar pivoted at $p'$.

$b'$ is a metallic contact-point. On the surface of wheel W is a series of pins, $w \; w$, one of which pins, upon the movement of the clock-work, comes in contact with the end of bar $b$, turning said bar onto the contact $b'$, thus completing a local circuit through vibrating bell V. Upon the outside of the case-cover C' is an arm or pointer, $p$. This arm is pivoted upon the same support $p'$, bearing bar $b$, and moves with said bar. The purpose of pointer $p$ is to afford a means for returning bar $b$ to its normal position to stop the alarm-bell V. The entire mechanism is placed in a case or box, C, of suitable construction.

In Fig. 2, C' is the case-cover, having a dial bearing letters or figures for designating the several indicating-points, and a pointer, P, placed upon the bearing $a$, which projects through case-cover C' for that purpose, pointer P and arm A moving in unison.

The operation of the device is as follows: Supposing a connection to be made at circuit-closer 3, circuit is formed via wire E, battery M B, wire E', disk D, contact-spring $s''$, and wire $e$; armature-bar $m$ is attracted; the clock-work immediately starts. At the first movement of wheel W one of the pins $w$ strikes bar $b$ and tilts its outer end against contact-point $b'$, whereupon alarm-bell V sounds an alarm, which will continue until an attendant stops the clock-work and returns bar $b$ to its normal position. The arm A immediately begins its rotary movement, breaking connection between disk D and springs $s$ and $s'$ in turn, without affecting the circuit; but the instant it breaks contact between spring $s''$ and the disk the circuit is opened and armature-bar $m$ again engages fly $f$, whereupon the clock-work is suddenly stopped, the dial and pointer on the outside of the case indicating the point designated "3" as the one at which the circuit has been closed.

After the reception of a signal of the character herein described the apparatus should be returned to a normal position. This is done by pressing the circuit-closer B, whereby a complete circuit is formed through wire E. The arm A is allowed to rotate until it arrives at the desired position, when circuit-closer B is released and the indicator is again ready for the reception of a signal, care being taken to keep the clock-work properly wound.

The cut-outs $c\ c'\ c''$ are for the purpose of disconnecting any transmitting-point, in case it is desirable to do so, a metallic switch-pin, $c''$, normally connecting $c$ and $c'$, being removed to effect such disconnection.

Various changes in the mechanical construction of the parts may suggest themselves; but

What I claim, and desire to secure by Letters Patent, is—

1. In an electrical indicator, the combination of an electro-magnet in a normally-open electrical circuit, having one or more normally-open branches connected to said electrical circuit through the medium of a metallic disk or ring, one or more circuit-closers located at various points in the electrical circuit, and a motor-driven radial arm for automatically breaking connection between said circuit and its branches.

2. In an electrical indicator, the combination of an electro-magnet located in a normally-open electrical circuit, one or more normally-open branch circuits connected to the said electrical circuit through the medium of a metallic disk or ring, one or more circuit-closers located at various points in the said electrical circuit, and a motor-driven radial arm normally held in check by said electro-magnet for automatically breaking connection between said electrical circuit and each branch circuit in succession.

3. The combination, in an electrical indicator, of a normally-open circuit having a series of branches, a circuit-closer for each branch, located at various points in the said circuit, an electro-magnet the coils of which form part of the said circuit, a motor-driven arm held in check by the electro-magnet, and a dial and pointer.

4. The combination, in an electrical indicator, of a normally-open electrical circuit having a series of branches, a series of circuit-closers, one for each branch, located at various points in the said circuit, an electro-magnet located in said circuit, a conducting disk or ring having upon its periphery a series of springs, one for each branch, a motor-driven arm, and a dial and pointer.

5. In an electrical indicator, the combination of a normally-open circuit having a series of branches, a conducting ring or disk having a series of springs connecting said circuit and branches, a series of circuit-closers for completing the normally-open circuit, an electro-magnet in said circuit, a motor-driven arm, a dial and pointer, and an alarm-bell.

WM. H. BAKER.

Witnesses:
WM. B. VANSIZE,
JOHN DORAN.